(12) United States Patent
Inomata (10) Patent No.: US 8,156,294 B2
(45) Date of Patent: Apr. 10, 2012

(54) APPARATUS AND METHOD FOR CONTROLLING STORAGE BUFFERS

(75) Inventor: Naoki Inomata, Kanagawa (JP)

(73) Assignee: Sony Corporation, Tokyo (JP)

( * ) Notice: Subject to any disclaimer, the term of this patent is extended or adjusted under 35 U.S.C. 154(b) by 491 days.

(21) Appl. No.: 12/392,304

(22) Filed: Feb. 25, 2009

(65) Prior Publication Data

US 2009/0259814 A1   Oct. 15, 2009

(30) Foreign Application Priority Data

Apr. 10, 2008   (JP) .................................. 2008-102104

(51) Int. Cl.
*G06F 13/38*   (2006.01)
*G06F 5/16*   (2006.01)

(52) U.S. Cl. .............. 711/157; 711/154; 710/51; 710/56

(58) Field of Classification Search .................... None
See application file for complete search history.

(56) References Cited

U.S. PATENT DOCUMENTS

| 2003/0084246 A1* | 5/2003 | Tran et al. ..................... 711/122 |
| 2006/0123194 A1* | 6/2006 | Cukierkopf et al. .......... 711/118 |
| 2007/0101045 A1* | 5/2007 | Lee et al. .......................... 711/5 |

FOREIGN PATENT DOCUMENTS

| JP | 2000-216824 | 8/2000 |
| JP | 2004-157795 | 6/2004 |
| JP | 2005-92630 | 4/2005 |
| JP | 2005-278054 | 10/2005 |
| JP | 2006-301724 | 11/2006 |

* cited by examiner

*Primary Examiner* — Than Nguyen (74) *Attorney, Agent, or Firm* — Oblon, Spivak, McClelland, Maier & Neustadt, L.L.P.

(57) ABSTRACT

Disclosed herein is a memory control apparatus including: a plurality of buffers configured to store data; a plurality of input ports configured to input the data to be written into the buffers; a plurality of output ports configured to output the data read from the buffers; a write control circuit configured to write the data inputted via each of the input ports into an unused one of the buffers; and a read control circuit configured to read the data written into the unused buffer, and supply the read data to a particular one of the output ports corresponding to a destination of the data.

9 Claims, 9 Drawing Sheets

APPARATUS AND METHOD FOR CONTROLLING STORAGE BUFFERS

BACKGROUND OF THE INVENTION

1. Field of the Invention

The present invention relates to a memory control apparatus, and a method for controlling the same. In particular, the present invention relates to a memory control apparatus and a method for controlling the same which achieve efficient data transfer with a smaller number of buffers.

2. Description of the Related Art

Figure 1:
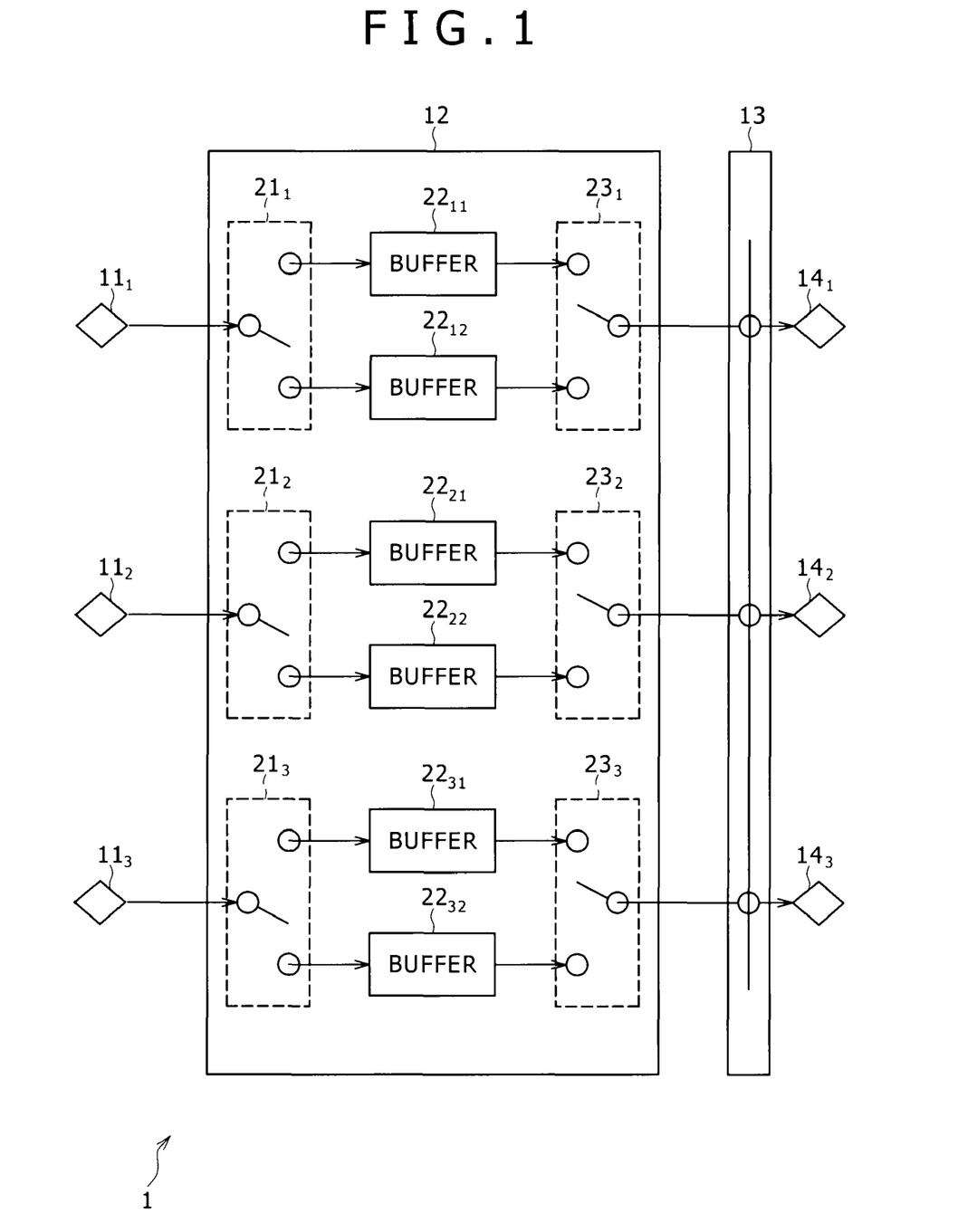
FIG. 1 illustrates the structure of a known memory control apparatus.

FIG. 1 illustrates the structure of a known memory control apparatus 1.

In FIG. 1, the memory control apparatus 1 includes three input ports, input ports $11_1$, $11_2$, and $11_3$, and three output ports, output ports $14_1$, $14_2$, and $14_3$. The memory control apparatus 1 outputs data that is inputted thereto via each of the input ports $11_1$ to $11_3$ via one of the output ports $14_1$ to $14_3$ through a memory control section 12 and a signal switch section 13.

Specifically, with reference to FIG. 1, data that has been inputted to the memory control section 12 via the input port $11_1$ is stored in a buffer $22_1$, selected by a write control section $21_1$. Then, the data stored in the buffer $22_{11}$ is outputted, as output data, via the output port $14_1$ selected by a read control section $23_1$ by way of the signal switch section 13.

The signal switch section 13 is a device for routing a signal from an arbitrary one of buffers $22_{11}$, $22_{12}$, $22_{21}$, $22_{22}$, $22_{31}$, and $22_{32}$ to an arbitrary one of the output ports $14_1$ to $14_3$.

At this time, upon completion of the writing of the data into the buffer $22_{11}$, the write control section $21_1$ selects the buffer $22_{12}$ as a buffer to which next data is to be written. As a result, the write control section $21_1$ is able to write the next data from the input port $11_1$ into the buffer $22_{12}$ instantly, even if reading of the data from the buffer $22_{11}$ is not completed by the read control section $23_1$. Note, however, that in the case where the reading of the data from the buffer $22_{11}$ is not completed when the writing of the data into the buffer $22_{12}$ is complete, the write control section $21_1$ is prohibited from writing next data into the buffer $22_{11}$.

In FIG. 1, a set of a write control section $21_2$, the buffers $22_{21}$ and $22_{22}$, and a read control section $23_2$, and a set of a write control section $21_3$, the buffers $22_{31}$ and $22_{32}$, and a read control section $23_3$, have the same structure and operate in the same manner as the set of the write control section $21_1$, the buffers $22_{11}$ and $22_{12}$, and the read control section $23_1$. Therefore, descriptions thereof are omitted.

Next, with reference to a timing diagram of FIG. 2, operations of the buffers $22_{11}$ to $22_{32}$ as illustrated in FIG. 1 will now be described below.

Figure 2:
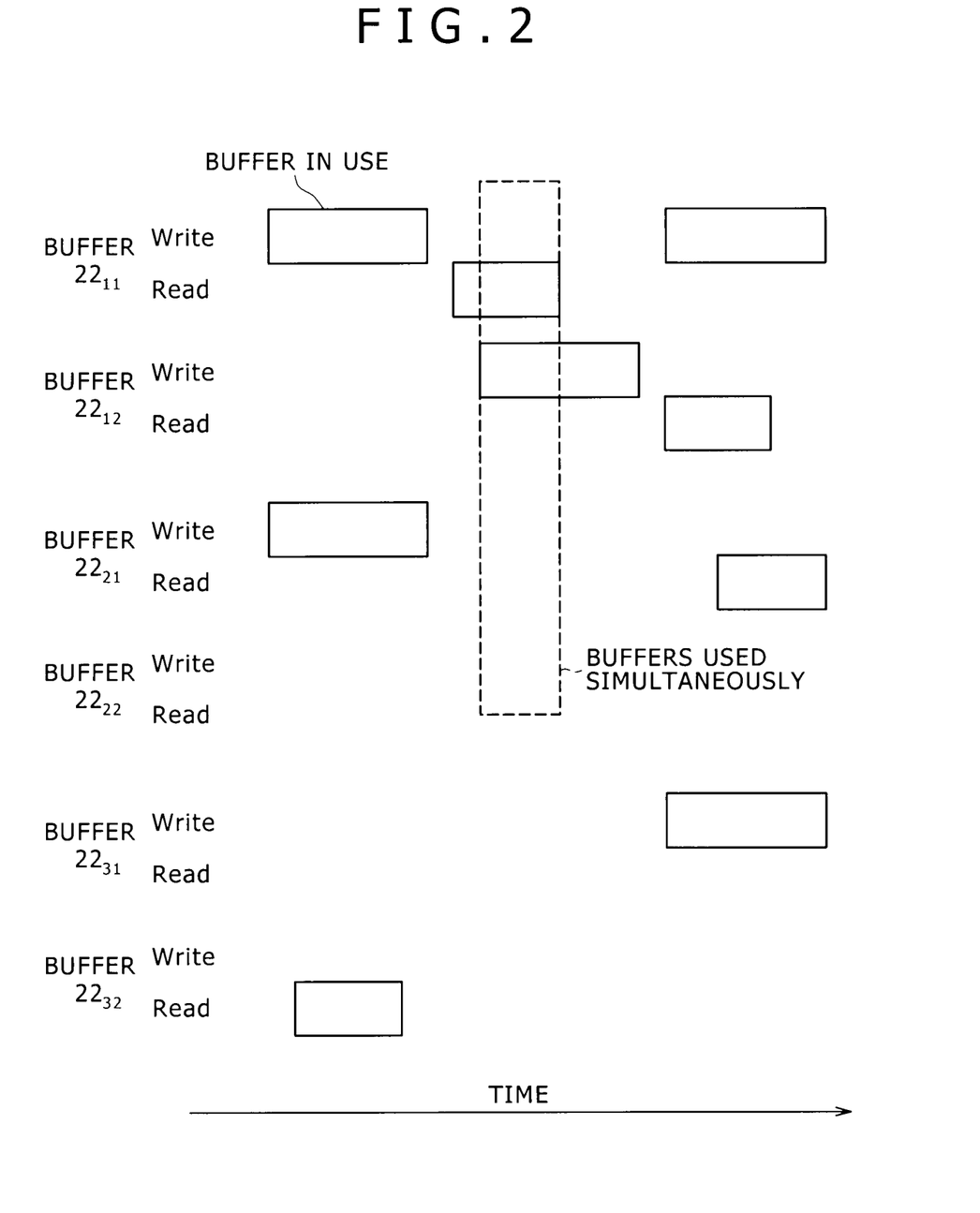
FIG. 2 is a timing diagram for explaining an operation of the known memory control apparatus.

In FIG. 2, rectangles represent that the corresponding buffer is in use, and concerning the operation of each of the buffers $22_{11}$ to $22_{32}$, a data writing process (Write) and a data reading process (Read) are distinguished from each other in representation. A horizontal axis represents a time axis, and the time passes from left to right in the figure.

As illustrated in FIG. 2, while the process of writing the data into the buffer $22_{11}$ is performed, the process of writing the data is not performed in the buffer $22_{12}$, and during this time, no particular process is performed therein. Then, after the writing of the data from the input port $11_1$ into the buffer $22_{11}$ is completed, the process of reading the data from the buffer $22_{11}$ is performed, while the process of writing data into the buffer $22_{12}$ is started.

That is, while one of the pair of the buffers $22_{11}$ and $22_{12}$ performs the writing process, the other is allowed to perform any other process than the writing process, i.e., the reading process, until the writing process in the former is completed. In other words, the writing process is not performed simultaneously in the buffers that are paired with each other. This is also true with the other pairs of buffers as illustrated in FIG. 1, i.e., the pair of the buffers $22_{21}$ and $22_{22}$ and the pair of the buffers $22_{31}$ and $22_{32}$, as shown in FIG. 2.

As described above, the memory control apparatus 1 accomplishes the data transfer by performing the writing process or the reading process while switching between the buffers $22_{11}$ and $22_{12}$, between the buffers $22_{21}$ and $22_{22}$, and between the buffers $22_{31}$ and $22_{32}$.

The present assignee has proposed a technique related to memory control (see, for example, Japanese Patent Laid-Open No. 2005-92630, hereinafter referred to as Patent Document 1).

In this previously proposed technique, the reading and writing of the data from or into the memory are controlled in accordance with an order in which access requests are processed.

SUMMARY OF THE INVENTION

In related-art techniques, including the technique as described in Patent Document 1, an increase in the number of ports involves an increase in the number of buffers required, resulting in a problem of increased use of resources.

Suppose, for example, that the number of ports should be increased in FIG. 1. Then, provision of an additional pair(s) of buffers would accordingly be required, i.e., provision of two more buffers would be required for each additional port.

As illustrated in the timing diagram of FIG. 2 for the buffers $22_{11}$ to $22_{32}$ as illustrated in FIG. 1, in the case where timing of writing and reading is not uniform in each port, two buffers, i.e., the buffers $22_{11}$ and $22_{12}$, are used simultaneously at a certain point in time, as indicated by a dotted line in the figure, while the other buffers are not operating at all. This means that resources of the multiple buffers are not used effectively.

The present invention addresses the above-identified, and other problems associated with existing methods and apparatuses, and has been devised to achieve efficient data transfer with a smaller number of buffers.

According to an embodiment of the present invention, there is provided a memory control apparatus including: a plurality of buffers configured to store data; a plurality of input ports configured to input the data to be written into the buffers; a plurality of output ports configured to output the data read from the buffers; a write control circuit configured to write the data inputted via each of the input ports into an unused one of the buffers; and a read control circuit configured to read the data written into the unused buffer, and supply the read data to a particular one of the output ports corresponding to a destination of the data.

According to another embodiment of the present invention, there is provided a method for controlling a memory control apparatus including a plurality of buffers configured to store data, a plurality of input ports configured to input the data to be written into the buffers, and a plurality of output ports configured to output the data read from the buffers, the method including the steps of: writing the data inputted via each of the input ports into an unused one of the buffers; and reading the data written into the unused buffer, and supplying the read data to a particular one of the output ports corresponding to a destination of the data.

In the memory control apparatus and the method for controlling the memory control apparatus according to the above-described embodiments of the present invention, data inputted via any of the input ports is written into an unused one of the plurality of buffers, and the data written to the unused buffer is read therefrom and outputted via a particular one of the output ports corresponding to a destination of the data.

As described above, according to the embodiments of the present invention, efficient data transfer is achieved with a smaller number of buffers.

DETAILED DESCRIPTION OF THE PREFERRED EMBODIMENT

Hereinafter, a preferred embodiment of the present invention will be described with reference to the accompanying drawings.

Figure 3:
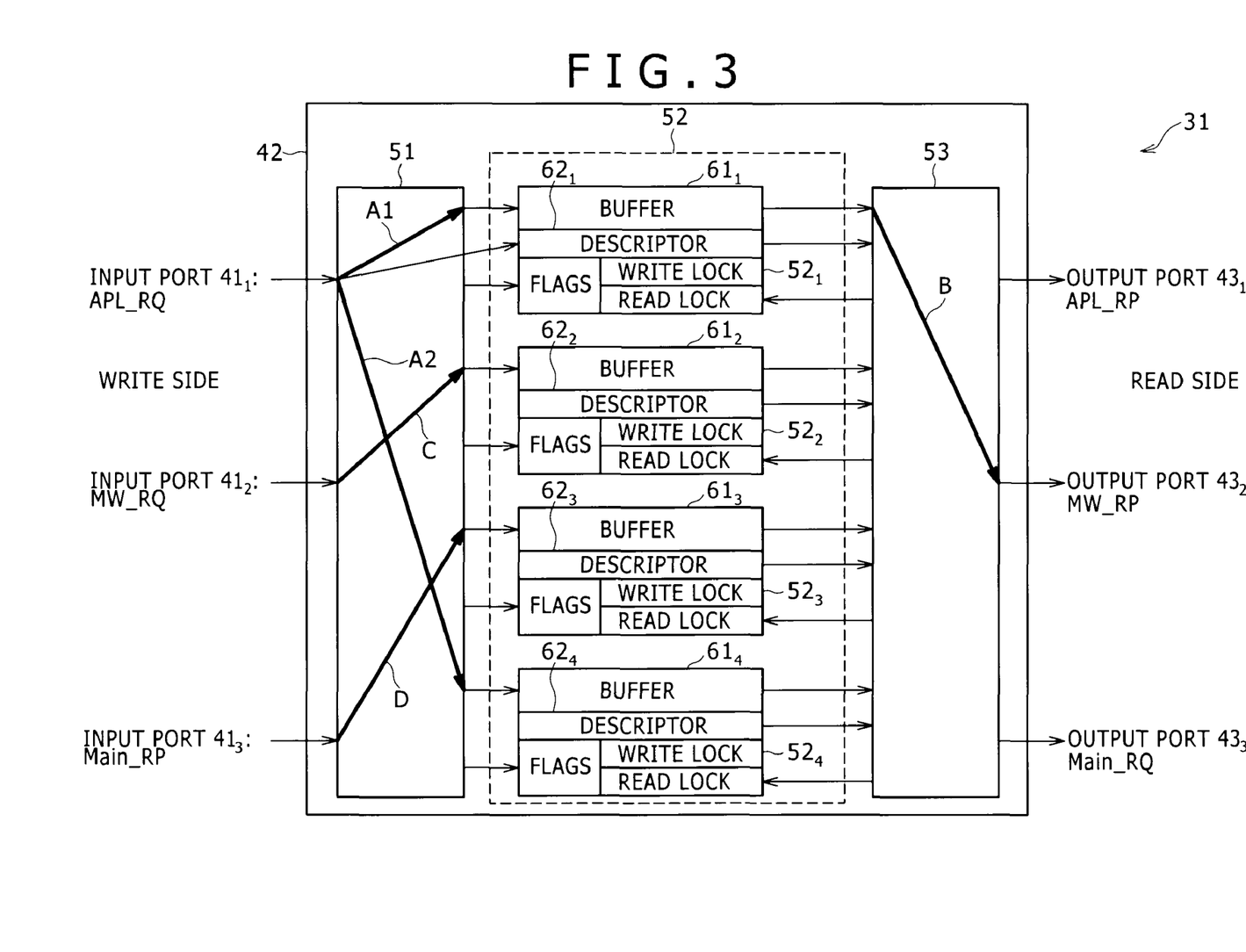
FIG. 3 illustrates the structure of a memory control apparatus according to an embodiment of the present invention.
Figure 4:
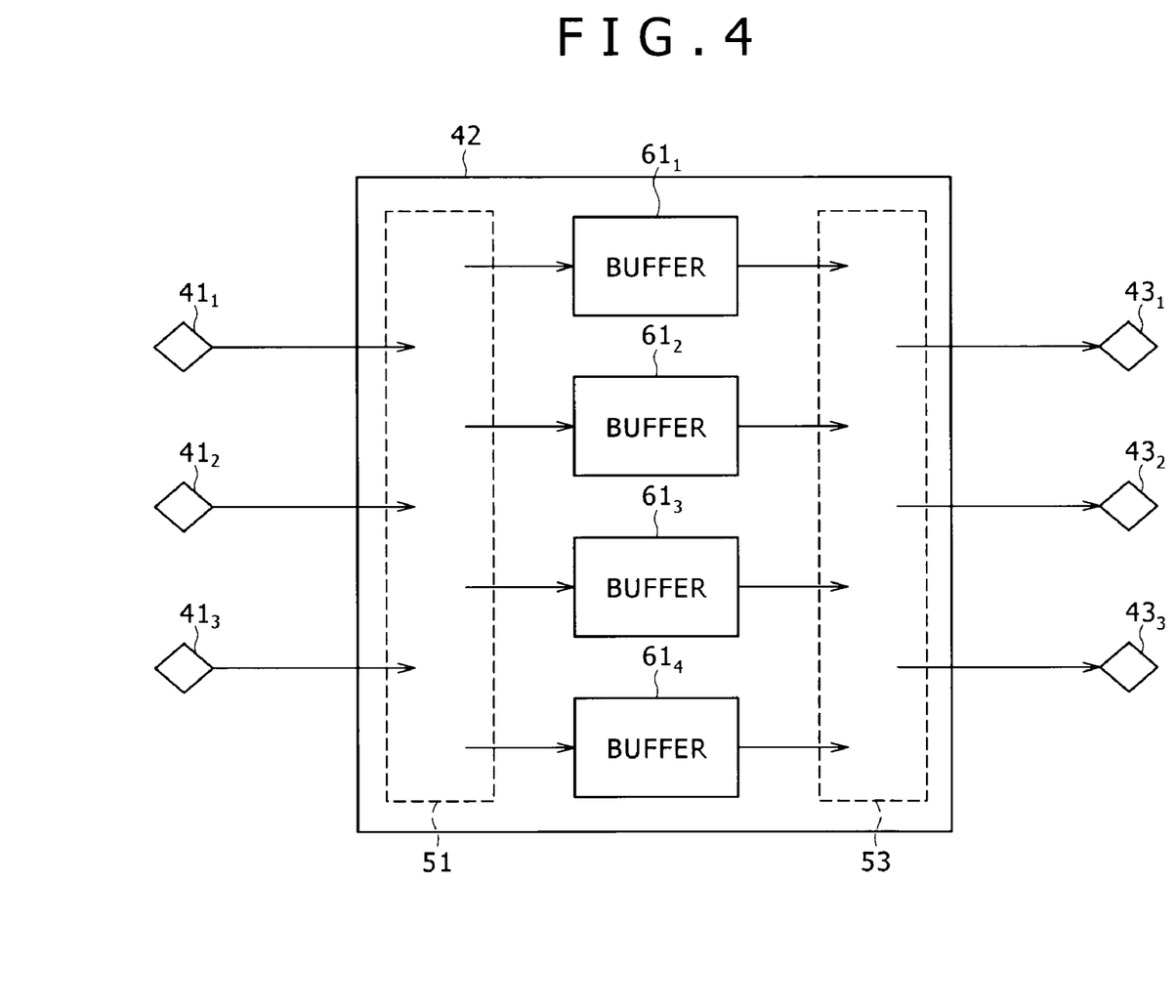
FIGS. 4, 5, 6, and 7 are diagrams for explaining an operation of the memory control apparatus.

FIG. 3 illustrates the structure of a memory control apparatus 31 according to an embodiment of the present invention.

The memory control apparatus 31 includes input ports $41_1$, $41_2$, and $41_3$, a memory control section 42, and output ports $43_1$, $43_2$, and $43_3$.

In the following description of the present embodiment, the input ports $41_1$ to $41_3$ on a write side will be referred to simply as "input ports 41" unless they need to be distinguished from one another, and similarly, the output ports $43_1$ to $43_3$ on a read side will be referred to simply as "output ports 43" unless they need to be distinguished from one another.

In FIG. 3, given devices are connected to the input ports $41_1$ to $41_3$, and data from the given devices are inputted to the input ports $41_1$ to $41_3$. In the present embodiment, it is assumed that, as the data from those devices, APL_RQ is inputted to the input port $41_1$, MW_RQ is inputted to the input port $41_2$, and Main_RP is inputted to the input port $41_3$, for example. Here, RQ stands for request, and RP stands for response. In the example of FIG. 3, APL_RQ represents a request from APL, MW_RQ represents a request from MW, and Main_RP represents a response from Main.

Each of the input ports $41_1$ to $41_3$ is a port dedicated to writing, and outputs the input data to the memory control section 42.

The memory control section 42 includes a write control section 51, a memory 52, and a read control section 53. In the example of FIG. 3, the memory 52 is composed of four memories $52_1$, $52_2$, $52_3$, and $52_4$. The memory $52_1$ includes a buffer $61_1$ and a descriptor $62_1$, and stores a write lock flag and a read lock flag.

Here, the write lock flag is a flag that indicates whether or not a process of writing data into the buffer $61_1$ is being performed. Thus, the write lock flag indicates "1" when the process of writing the data into the buffer $61_1$ is performed, and "0" when the process of writing the data into the buffer $61_1$ is not being performed.

The read lock flag is a flag that indicates whether or not a process of reading the data stored in the buffer $61_1$ is being performed. Thus, the read lock flag indicates "1" when the process of reading the data stored in the buffer $61_1$ is being performed, and "0" when the process of reading the data stored in the buffer $61_1$ is not being performed.

Although a description is omitted in order to avoid redundancy, each of the memories $52_2$ to $52_4$ has the same structure as the memory $52_1$, as illustrated in FIG. 3. Regarding the memory 52, the buffers $61_1$, $61_2$, $61_3$, and $61_4$ will be referred to simply as "buffers 61" unless they need to be distinguished from one another, and the descriptors $62_1$, $62_2$, $62_3$, and $62_4$ will be referred to simply as "descriptors 62" unless they need to be distinguished from one another.

The data inputted to the memory control section 42 is inputted to the write control section 51. The write control section 51 refers to the write lock flag in each of the memories $52_1$ to $52_4$ to select, from among the buffers $61_1$ to $61_4$, a buffer 61 that is not in use, and connects the selected unused buffer 61 with the input port 41 from which the data has been inputted. As a result, the data from the input port 41 is written into the selected unused buffer 61.

In the description of the present embodiment, any buffer 61 where neither a data writing process nor a data reading process is being performed and where no data is stored is referred to as an "unused (empty) buffer." On the other hand, any buffer 61 where the data writing process or the data reading process is being performed and where data is stored is referred to as a "used buffer."

The read control section 53 refers to the read lock flag in each of the memories $52_1$ to $52_4$ to recognize a buffer 61 where the data from the input port 41 is stored, and connects the buffer 61 where the input data is stored with one of the output ports 43 that is specified by the write control section 51.

As an example of a method in which the write control section 51 specifies the particular one of the output ports 43, the write control section 51 may write information for specifying the particular one of the output ports 43 into the descriptor 62. Application of this method allows the read control section 53 to identify the particular one of the output ports 43 to which the data stored in the buffer 61 is to be outputted, by reading the information concerning the output port 43 from the descriptor 62 written thereto by the write control section 51. The output port 43 identified in this manner is connected with the buffer 61 where the data from the input port 41 is stored, so that the data stored in the buffer 61 is outputted.

Each of the output ports $43_1$ to $43_3$ is a port dedicated to reading, and outputs the data from the buffer 61 with which it is connected by the read control section 53. In FIG. 3, given devices are connected to the output ports $43_1$ to $43_3$, and the data from the buffer 61 is outputted to those devices. In the present embodiment, it is assumed that, as the data outputted to those devices, APL_RP is outputted from the output port $43_1$, MW_RP is outputted from the output port $43_2$, and Main_RQ is outputted from the output port $43_3$.

The memory control apparatus 31 has the above-described structure.

Here, in order to provide a more detailed description of the structure of the memory control apparatus 31 as illustrated in FIG. 3, an exemplary case will now be described below where a message (APL_RQ) from APL, which is an originator, is transferred to MW, which is a destination, with reference to FIG. 3. More specifically, in this exemplary case, the message is inputted to the input port $41_1$ and outputted via the output port $43_2$, in FIG. 3.

Of the buffers $61_1$ to $61_4$, the write control section 51 selects the unused buffer $61_1$, for example, and connects the unused buffer $61_1$ with the input port $41_1$ through which the message (APL_RQ) has been inputted (see solid line A1 in the figure). As a result, the message inputted to the memory control section 42 will be written into the unused buffer $61_1$.

At this time, the write control section 51 refers to the write lock flag in each of the memories $52_1$ to $52_4$ to select the unused buffer $61_1$. Since the write lock flag indicates "1" when the corresponding buffer 61 is a used buffer, and "0" when the corresponding buffer 61 is an unused buffer, the write control section 51 selects the buffer $61_1$ of the memory $52_1$ whose write lock flag indicates "0."

The write control section 51 switches the write lock flag in the memory $52_1$ from "0" to "1" when writing the message into the unused buffer $61_1$ after selecting it. This prevents other data from being written into the unused buffer $61_1$. In the case where the write lock flag in each of the memories $52_1$ to $52_4$ indicates "1," i.e., in the case where all of the buffers $61_1$ to $61_4$ are used buffers, the write control section 51 may start monitoring the write lock flags and, when the write lock flag in any of the memories $52_1$ to $52_4$ has been switched to "0," select the unused buffer 61 corresponding to that write lock flag.

In addition, since the write control section 51 is to output the message from the input port $41_1$ to a particular one of the output ports, the output port $43_2$, the write control section 51 writes information indicating that the message is targeted at the output port $43_2$ into the descriptor $62_1$, in addition to selecting the unused buffer $61_1$. When the writing of the message from the input port $41_1$ into the unused buffer $61_1$ has been completed thereafter, the write lock flag in the memory $52_1$ is switched by the write control section 51 from "1" to "0." Then, the write control section 51 switches the read lock flag in the memory $52_1$ from "0 to "1" to notify the read control section 53 of presence of the message in the memory $52_1$.

The read control section 53 refers to the read lock flag in each of the memories $52_1$ to $52_4$ to recognize that the message has been stored in the buffer $61_1$. The read control section 53 further refers to the descriptor $62_1$ in the memory $52_1$ to recognize that the message should be outputted via the particular output port $43_2$. Then, the read control section 53 connects the buffer $61_1$, in which the message from the originator (APL) is stored, with the output port $43_2$, which leads to the destination (MW) as specified by the write control section 51 (see solid line B in the figure).

At this time, the write control section 51 checks the states of the write lock flag and the read lock flag in each of the memories $52_1$ to $52_4$. If the write control section 51 finds any unused buffer 61 whose write lock flag and read lock flag both indicate "0," the write control section 51 connects that unused buffer 61 with the input port $41_1$. Referring to FIG. 3, in the case where the buffer $61_4$ is not in use, for example, the write control section 51 connects the input port $41_1$ with the buffer $61_4$ in the memory $52_4$ (see solid line A2 in the figure).

Meanwhile, if the whole of the message stored in the buffer $61_1$ in the memory $52_1$, which is connected with the output port $43_2$, is outputted via the output port $43_2$, the read control section 53 is notified by an entity at the destination (MW) beyond the output port $43_2$, for example, via a register or the like, that the reading of the message has been completed. Upon receipt of this notification, the read control section 53 switches the read lock flag in the memory $52_1$ from 1 to 0. As a result, the buffer $61_1$ in the memory $52_1$ becomes an unused buffer.

In the case where, while the message from the input port $41_1$ is stored in the buffer $61_1$, messages have been inputted from the input ports $41_2$ and $41_3$, the write control section 51 checks the states of the write lock flag and the read lock flag in each of the memories $52_1$ to $52_4$. Then, the write control section 51 connects the input port $41_2$ with the unused buffer $61_2$ (see solid line C in the figure), and the input port $41_3$ with the unused buffer $61_3$ (see solid line D in the figure). In other words, if any data is inputted from the input port 41, the write control section 51 writes that data into an unused buffer 61 as appropriate.

As described above, in the memory control apparatus 31, the data from the input port 41 is written into an unused one of the multiple buffers $61_1$ to $61_4$, and the data written into the unused buffer is outputted via the particular one of the output ports 43 corresponding to the destination.

In short, the input port 41 and the output port 43 are connected with an unused buffer selected from among the multiple buffers, instead of a particular predetermined buffer. Therefore, an increase in the number of input ports 41 and output ports 43 does not require provision of additional buffers. While additional buffers might be provided, the total number of buffers does not need to be as large as twice the number of ports, for example. Thus, in the present embodiment, efficient data transfer can be achieved with a smaller number of buffers than is demanded in related art.

Moreover, since the present embodiment allows the data transfer to be achieved easily between an arbitrary pair of ports, it is not necessary to provide a device, such as a signal switch, for routing a signal from an arbitrary one of the buffers 61 to an arbitrary one of the output ports 43.

Next, with reference to FIGS. 4, 5, 6, 7, 8, and 9, the operations of connecting the input port 41 with the buffer 61, and the buffer 61 with the output port 43, in the memory control apparatus 31 as illustrated in FIG. 3 will now be described in more detail below.

Of the components of the memories $52_1$ to $52_4$, only the buffers $61_1$ to $61_4$ are depicted in FIGS. 4 to 7 and 9, in order to simplify the explanation. Note, however, that the processes as described above with reference to FIG. 3 are performed when the data inputted via any of the input ports $41_1$ to $41_3$ is written into one of the buffers $61_1$ to $61_4$, and when the data stored in any of the buffers $61_1$ to $61_4$ is read therefrom and outputted via one of the output ports $43_1$ to $43_3$.

Figure 5:
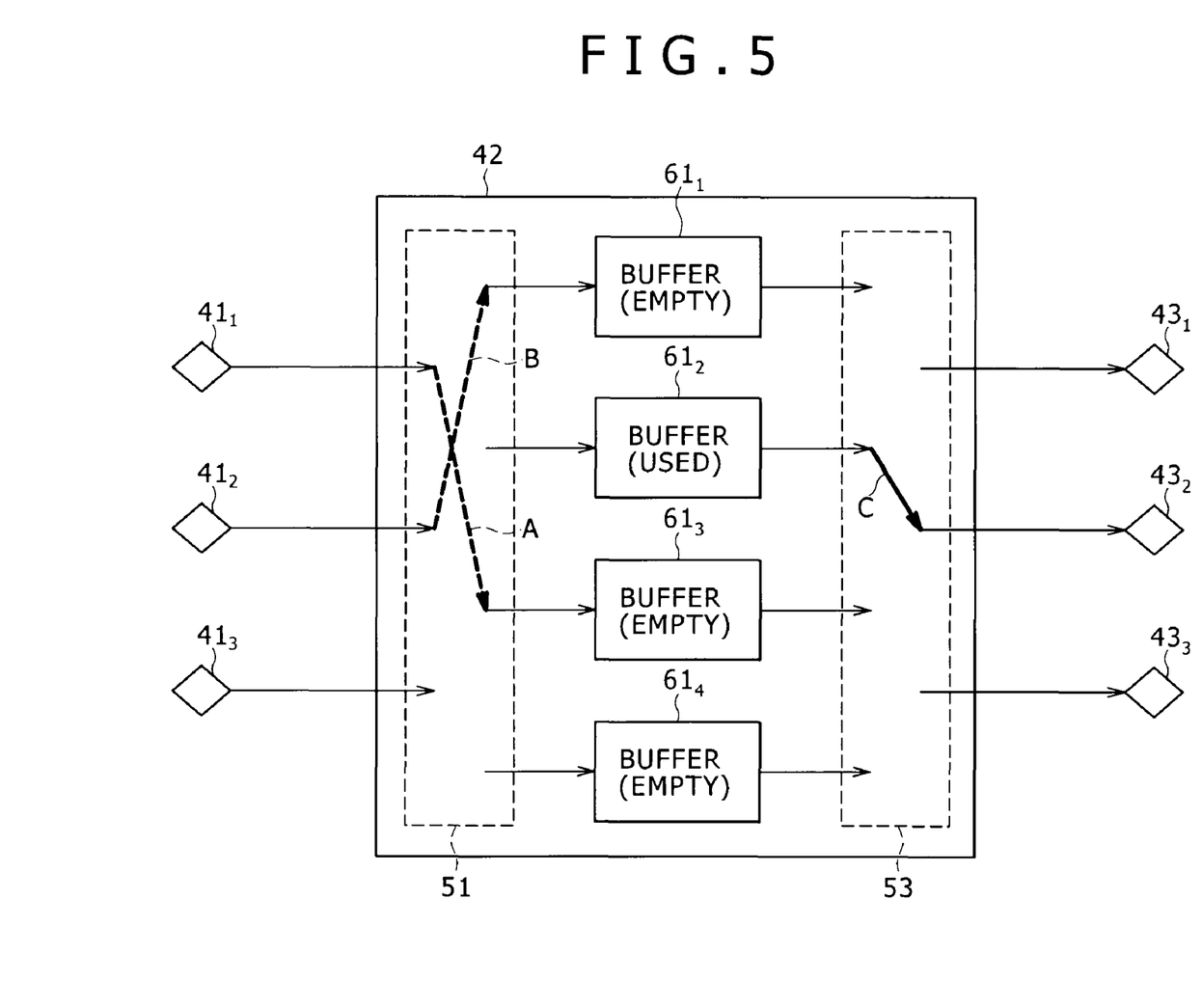

Referring to FIG. 5, suppose that, in the memory control section 42, the buffer $61_1$ is an unused (empty) buffer, the buffer $61_2$ is a used buffer, the buffer $61_3$ is an unused (empty) buffer, and the buffer $61_4$ is an unused (empty) buffer, and that the data is inputted via the input port $41_1$. In this case, the write control section 51 selects the unused buffer $61_3$ out of the buffers $61_1$ to $61_4$, and connects the unused buffer $61_3$ with the input port $41_1$ (see dotted line A in the figure). As a result, the input data from the input port $41_1$ is written into the buffer $61_3$.

Similarly, when data is inputted via the input port $41_2$, the write control section 51 selects the unused buffer $61_1$ out of the buffers $61_1$ to $61_4$, and connects the unused buffer $61_1$ with the input port $41_2$ (see dotted line B in the figure). As a result, the input data from the input port $41_2$ is written into the buffer $61_1$.

At this time, the used buffer $61_2$ is connected with the output port $43_2$ by the read control section 53 (see solid line C in the figure), and the data stored in the buffer $61_2$ is being outputted via the output port $43_2$.

Figure 6:
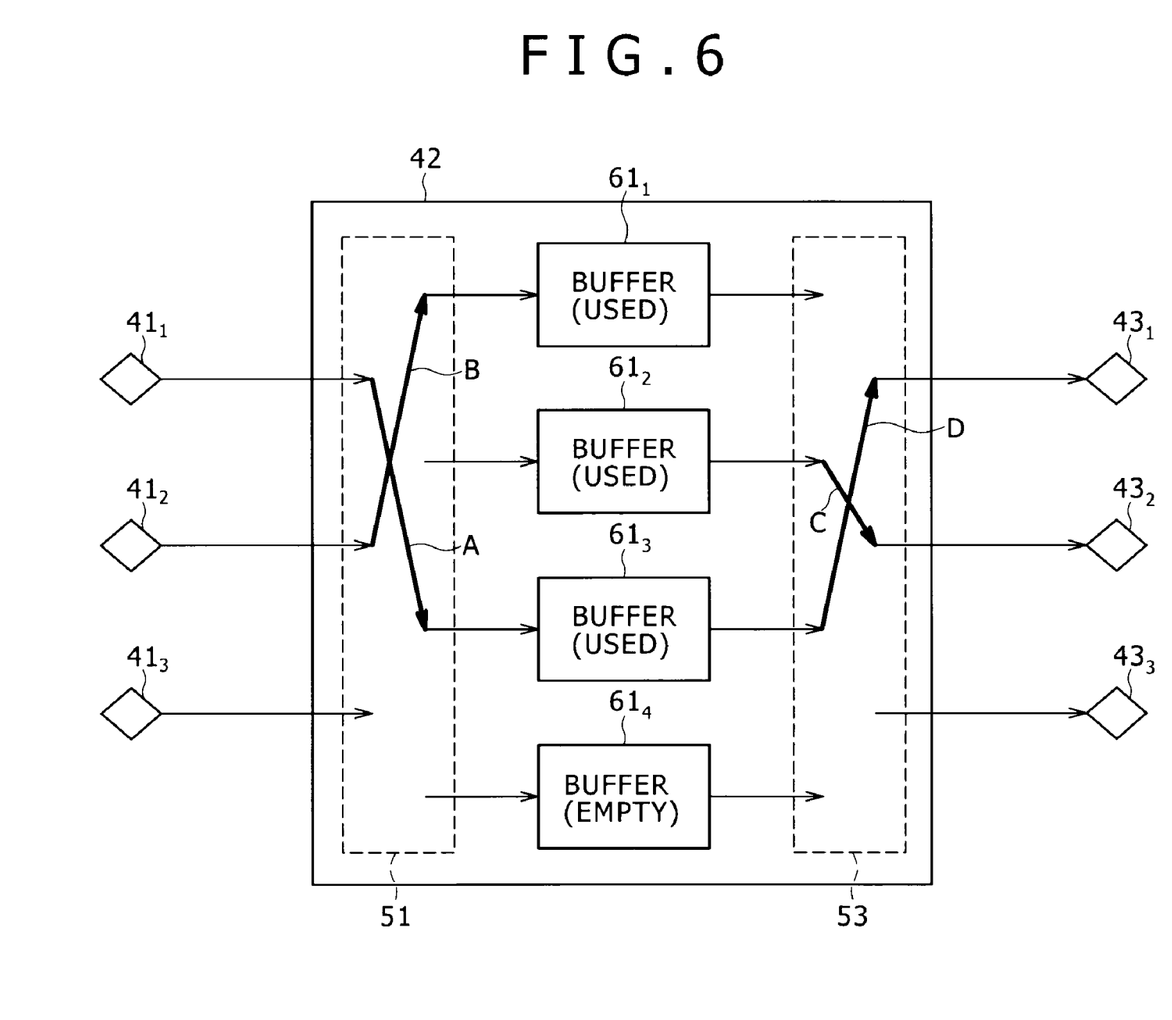

Here, the input data from the input port $41_1$ as stored in the buffer $61_3$ is to be outputted via the output port $43_1$. Therefore, if no other buffer is connected with the output port $43_1$, the read control section 53 connects the buffer $61_3$ with the output port $43_1$, as illustrated in FIG. 6, so that the input data can be outputted via the output port $43_1$ (see solid line D in the figure).

Meanwhile, the input data from the input port $41_2$ as stored in the buffer $61_1$ is to be outputted via the output port $43_2$. However, as illustrated in FIG. 6, since the output port $43_2$ is connected with the buffer $61_2$ by the read control section 53 (see solid line C in the figure), the output of the data stored in the buffer $61_1$ is suspended until the output of the data stored in the buffer $61_2$ to the output port $43_2$ is completed.

Figure 7:
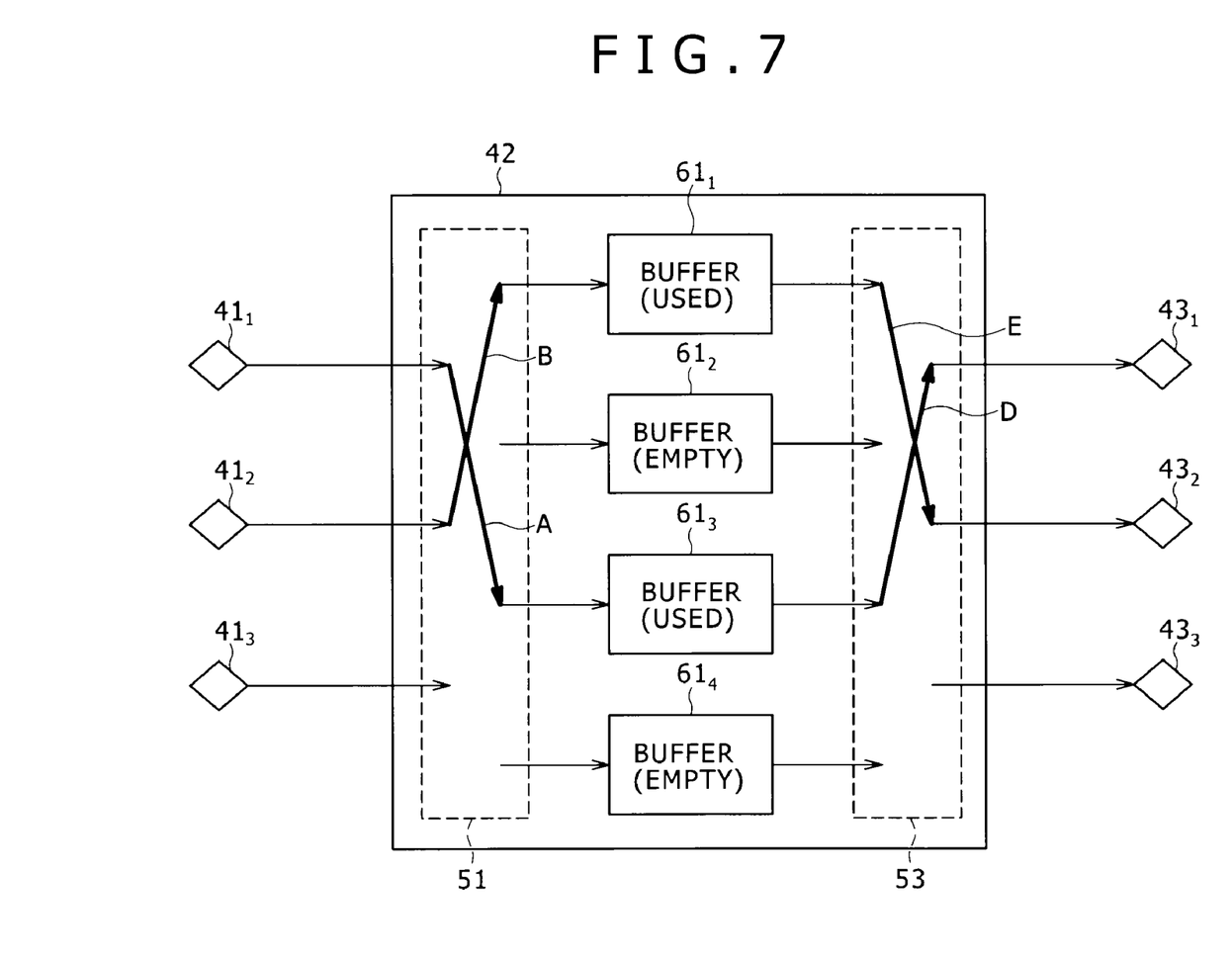

Thereafter, when the output of the data stored in the buffer $61_2$ to the output port $43_2$ is completed, the read control section 53 connects the buffer $61_1$ with the output port $43_2$, as illustrated in FIG. 7, so that the data can be outputted via the output port $43_2$ (see solid line E in the figure). As a result, the data from the input port $41_2$ as stored in the buffer $61_1$ is outputted via the output port $43_2$.

At this time, since the data stored in the buffer $61_2$ has been entirely outputted therefrom, the read lock flag in the buffer $61_2$ is reset, so that the buffer $61_2$ becomes an unused buffer.

Figure 8:
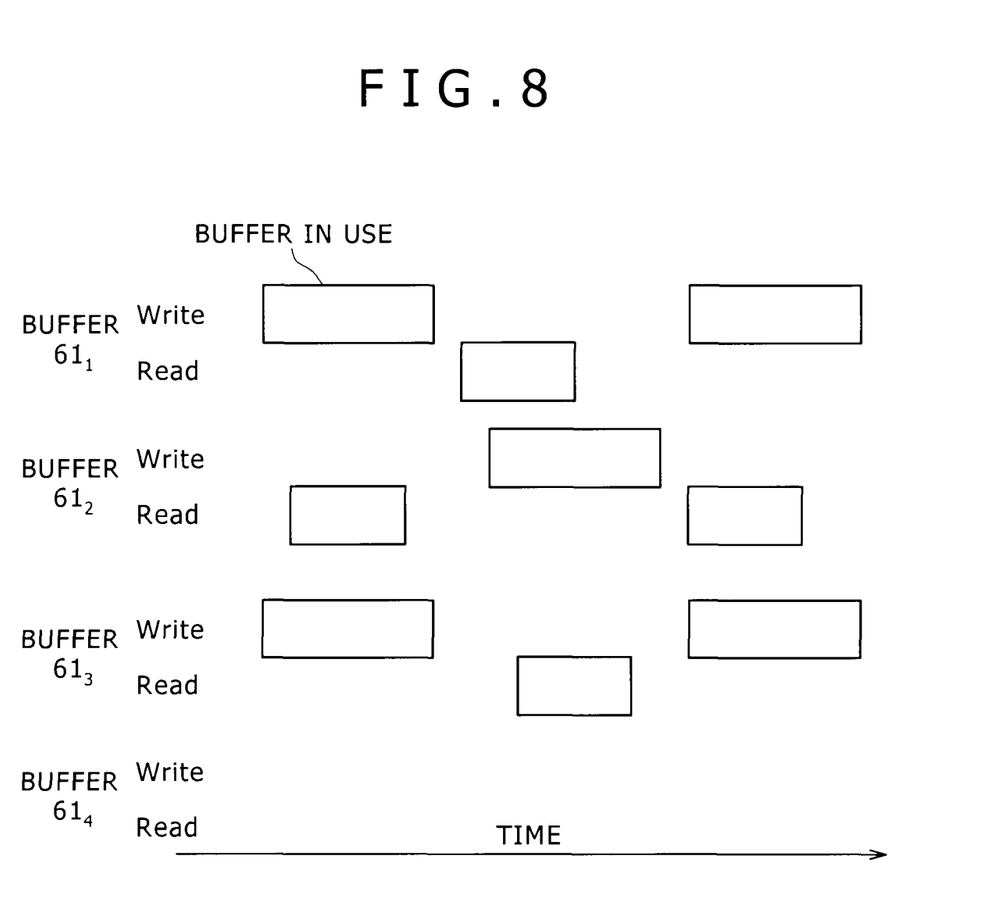
FIG. 8 is a timing diagram for explaining the operation of the memory control apparatus.

FIG. 8 is a timing diagram illustrating the states of the operations in connection with the buffers $61_1$ to $61_4$, as described above with reference to FIGS. 4 to 7.

In FIG. 8, rectangles represent that the corresponding buffer is in use, and concerning the operation of each of the buffers $61_1$ to $61_4$, the data writing process (Write) and the data reading process (Read) are distinguished from each other in representation. A horizontal axis represents a time axis, and the time passes from left to right in the figure.

Referring to FIG. 8, suppose, for example, that the data writing process is being performed in the buffers $61_1$ and $61_3$, and that the data reading process is being performed in the buffer $61_2$. Then, as soon as the data writing process is completed in the buffer $61_1$, the process of reading the written data from the buffer $61_1$ is performed. Regarding the buffer $61_2$, if new data is inputted after the data reading process is completed, the process of writing the new input data into the buffer $61_2$ is started, and thereafter the process of reading the written data therefrom is performed.

Regarding the buffer $61_3$, after the data writing process is completed, the process of reading the written data therefrom is performed, and if new data is inputted thereafter, the process of writing the new input data is started. In the example of FIG. 8, the buffer $61_4$ does not perform any particular operation and remains unused. However, when all of the buffers $61_1$ to $61_3$ are in use, data will be inputted to the buffer $61_4$.

In other words, as illustrated in FIG. 8, of the buffers $61_1$ to $61_4$ in the memory control apparatus 31, an unused buffer is selected and the data is stored in the unused buffer. When the data stored in the buffer has thereafter been outputted via the output port 43, that buffer becomes an unused buffer again.

Since the unused buffer(s) is employed as appropriate in the above-described manner, the efficiency in the use of the buffers is improved. Thus, efficient data transfer is accomplished without the need for extra resources. Moreover, even with a smaller number of buffers, equivalent or superior performance is accomplished as compared with related art.

Figure 9:
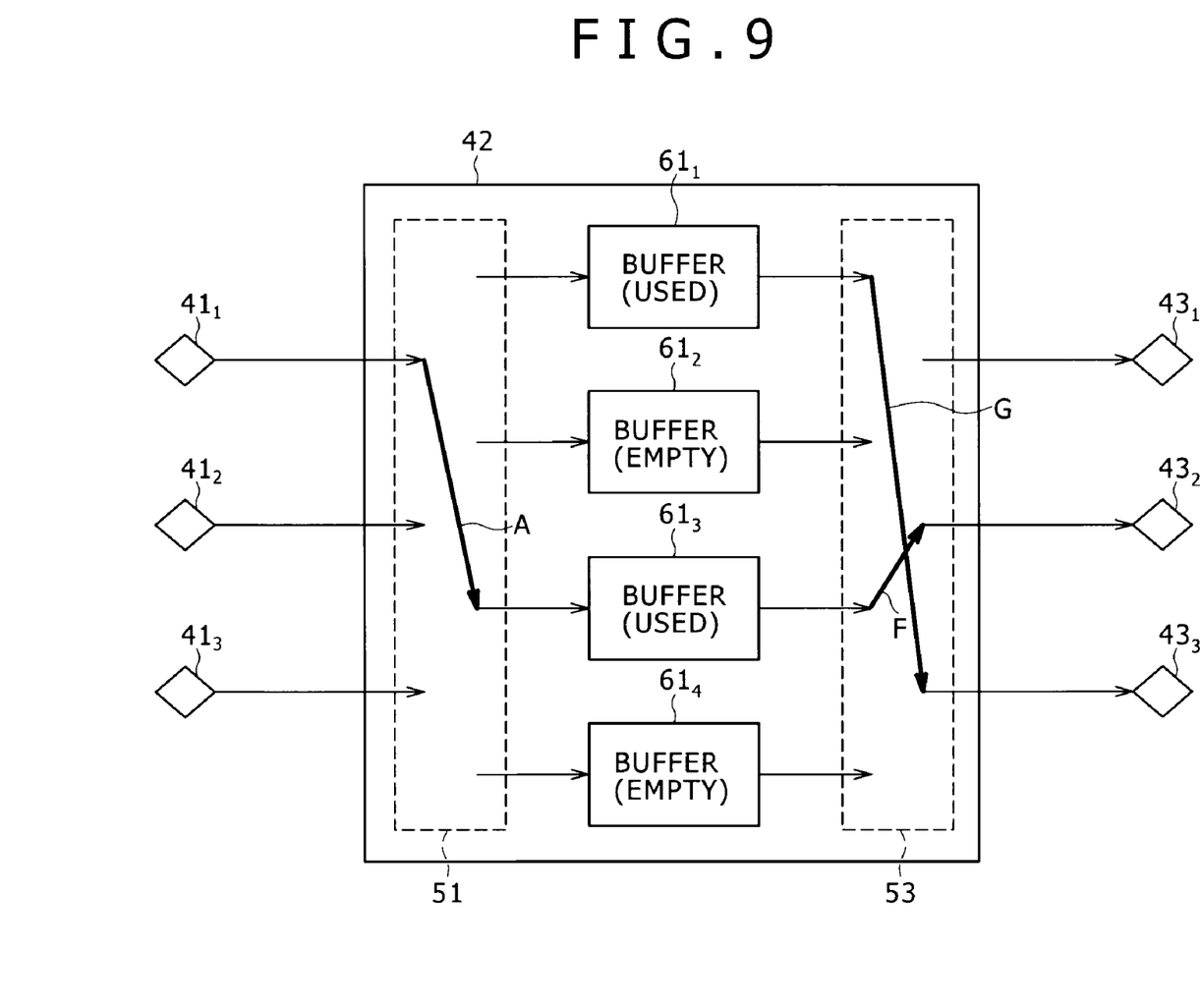
FIG. 9 is a diagram for explaining the operation of the memory control apparatus.

Still further, since the read control section 53 switches between the output ports 43, the data stored in the buffer 61 can be outputted to an arbitrary one of the output ports 43. For example, FIG. 7 illustrates the exemplary case where the read control section 53 connects the buffer $61_1$ with the output port $43_2$ (see solid line E in the figure), and the buffer $61_3$ with the output port $43_1$ (see solid line D in the figure). However, as illustrated in FIG. 9, the read control section 53 may connect the buffer $61_1$ with the output port $43_3$ (see solid line G in the figure), and the buffer $61_3$ with the output port $43_2$ (see solid line F in the figure), for example. Thus, the output port 43 corresponding to the destination can be selected flexibly, without the need for the provision of the device, such as the signal switch, for selecting the output port 43 corresponding to the destination.

As described above, the above-described embodiment of the present invention enables the data transfer to be achieved efficiently with a smaller number of buffers.

According to the above-described embodiment of the present invention, when there are a plurality of devices from which the data is inputted or to which the data is outputted, the route is switched appropriately to employ each buffer resource efficiently, so that efficient data transfer is accomplished with fewer resources. As a result, the function of bank memory can be achieved without the need for provision of pairs of write-use and read-use buffers.

Note that, in the present specification, steps that describe a program stored in a storage medium may and may not be performed chronologically in the order as described herein. Some of the steps may be performed in parallel or independently of one another.

Also note that the present invention is not limited to the above-described embodiment. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-102104 filed in the Japan Patent Office on Apr. 10, 2008, the entire content of which is hereby incorporated by reference.

What is claimed is:

1. A memory control apparatus, comprising:
a plurality of buffers each configured to store data inputted via any of a plurality of input ports;
the plurality of input ports configured to input data to be written into said buffers;
a plurality of output ports configured to output data read from said buffers;
a write control circuit configured to write the data inputted via one of said input ports into an unused one of said buffers such that said unused buffer only stores the data inputted via the same one of said input ports until the data stored in said unused buffer is read by a read control circuit; and
the read control circuit configured to read the data written into said unused buffer, and supply the data read from said unused buffer to a particular one of said output ports corresponding to a destination of the data read from said unused buffer.

2. The memory control apparatus according to claim 1, wherein, when said particular output port is already a destination of data read from another one of said buffers, said read control circuit reads the data written into said unused buffer and supplies the data read from said unused buffer to said particular output port after output of the data from the other one of said buffers is completed.

3. The memory control apparatus according to claim 1, wherein the number of said buffers is larger than the number of said input ports.

4. A method for controlling a memory control apparatus including
a plurality of buffers each configured to store data inputted via any of a plurality of input ports, the plurality of input ports configured to input data to be written into the buffers, and a plurality of output ports configured to output data read from the buffers, the method comprising the steps of:

writing the data inputted via one of the input ports into an unused one of the buffers such that the unused buffer only stores the data inputted via the same one of said input ports until the data stored in said unused buffer is read by a read control circuit;

reading the data written into the unused buffer; and supplying the data read from the unused buffer to a particular one of the output ports corresponding to a destination of the data read from the unused buffer.

5. The memory control apparatus according to claim 1, wherein the write control circuit is configured to write the data inputted via the one of said input ports into the unused buffer for which no processes of writing data from another one of said input ports and reading data from said unused buffer is pending.

6. The memory control apparatus according to claim 1, wherein each buffer is configured to store information identifying a particular output port to which data stored in the respective buffer is to be outputted.

7. The memory control apparatus according to claim 1, wherein each of said buffers is configured to store a write lock flag and a read lock flag.

8. The memory control apparatus according to claim 1, wherein each of said buffers is configured to store a write lock flag that indicates whether a process of writing data into the respective buffer is pending.

9. The memory control apparatus according to claim 1, wherein each of said buffers is configured to store a read lock flag that indicates whether a process of reading data stored in the respective buffer is pending.

* * * * *